United States Patent
Taylor et al.

(10) Patent No.: US 10,830,919 B1
(45) Date of Patent: Nov. 10, 2020

(54) REAL-TIME MAPPING OF INDUCED FRACTURE GEOMETRY BY RFID NETWORKS

(71) Applicants: Stewart Thomas Taylor, Amarillo, TX (US); John David Newton, Crowley, TX (US)

(72) Inventors: Stewart Thomas Taylor, Amarillo, TX (US); John David Newton, Crowley, TX (US)

( * ) Notice: Subject to any disclaimer, the term of this patent is extended or adjusted under 35 U.S.C. 154(b) by 63 days.

(21) Appl. No.: 16/171,060

(22) Filed: Oct. 25, 2018

Related U.S. Application Data (60) Provisional application No. 62/577,577, filed on Oct. 26, 2017.

(51) Int. Cl.
  *G01V 3/30* (2006.01)
  *E21B 43/267* (2006.01)
  *E21B 49/00* (2006.01)
  *G06K 7/10* (2006.01)

(52) U.S. Cl.
  CPC .............. *G01V 3/30* (2013.01); *E21B 43/267* (2013.01); *E21B 49/00* (2013.01); *G06K 7/10366* (2013.01)

(58) Field of Classification Search
  None
  See application file for complete search history.

(56) References Cited

U.S. PATENT DOCUMENTS

| | | | |
|---|---|---|---|
| 2002/0171560 A1* | 11/2002 | Ciglenec | E21B 7/061 340/853.1 |
| 2005/0110655 A1* | 5/2005 | Layton | E21B 43/128 340/854.9 |
| 2007/0227776 A1* | 10/2007 | Huang | E21B 41/0085 175/42 |
| 2013/0079935 A1* | 3/2013 | Kabannik | E21B 43/26 700/282 |
| 2013/0118733 A1* | 5/2013 | Kumar | E21B 41/0085 166/254.2 |
| 2017/0211371 A1* | 7/2017 | Brady | E21B 47/00 |

* cited by examiner

*Primary Examiner* — Jas A Sanghera
(74) *Attorney, Agent, or Firm* — Law Office of Jeff Williams PLLC; J. Oliver Williams (57) ABSTRACT

A method of mapping subsurface fracture geometry below a surface of the ground includes two independently powered systems, namely a plurality of sensors distributed through a hole in the subsurface and a downhole tool to facilitate reception and transmission of signal data from the plurality of sensors. The sensors are distributed into fissures within formations that have been hydraulically fractured. The sensors send signal data to the downhole tool for transmission to a unit on the surface. The signal data permits for the mapping of the fissures within the fractured formations.

19 Claims, 7 Drawing Sheets mMDRT – measured depth in metres below the rotary table or drilling floor

Extension fracture: Joint

FIG. 7

Shear fracture

FIG. 8

REAL-TIME MAPPING OF INDUCED FRACTURE GEOMETRY BY RFID NETWORKS

CLAIM OF PRIORITY

This application claims the benefit of U.S. Provisional Application No. 62/577,577, filed 26 Oct. 2017. The information contained therein is hereby incorporated by reference.

BACKGROUND

1. Field of the Invention

The present application relates generally to a method of providing real time maps of fracture locations during a reservoir stimulation project in the energy industry that may be conducted by geothermal or oil and gas companies.

2. Description of Related Art

Current methods implemented during hydraulic fracturing for oil and gas production generally use techniques of earthquake location to determine subsurface fracture locations induced by the hydraulic fracturing process. Those methods determine microearthquake hypocenter locations as a proxy for fracture locations based on the idea that associated earthquake, microearthquake, or microseismic event locations show the location of induced fractures. The seismic methods used to determine the hypocenter locations and the most commonly used relocation technique were developed in the early 20th century. Unfortunately, these methods yield hypocenter locations with errors as large as hundreds of feet. Errors in hypocenter location produce incorrect fracture location maps created during the interpretation of the microseismic monitoring results.

The methods outlined in this document describe technologies that yield precise locations of subsurface fractures and fracture networks including the internal geometry of the fractures which may extend over two thousand feet from the from the point at which the fracture is induced at the wellbore. These methods eliminate the need for industry standard forms of seismic hypocenter location which have inherently large location errors. The RFID protocols described in this document are designed to power an RFID network up to distances of several thousand feet from the radio frequency interrogator to produce real-time maps of induced fractures during a hydraulic fracturing project. Furthermore, these methods reduce the subsurface fracture location errors to less than a meter. While the focus of this disclosure is the description of methods necessary to provide real time maps of fracture locations during a stimulation project, the methods described can be used to process RFID network data after the stimulation project has been completed.

Some prior developments are seen in the following patent applications. U.S. Pat. No. 9,201,157 by Mohamadi discloses the monitoring of wells to detect the composition of matter in boreholes and propped fractures. Since the methodology disclosed in U.S. Pat. No. 9,201,157 is designed to detect the composition of matter in boreholes and fractures, and leaks from the system, it does not provide a mapping method for the geometry of fractures in the subsurface. Furthermore, the disclosure states that maximum distance of interrogator-RFID tag communication is tens of meters in (paragraph 29). However, the maximum distance of communication will decrease substantially in the presence of water such as hydraulic fracturing fluids or naturally occurring formation water (paragraphs 29, 37, 39). The maximum distance of communication decreases as the water content increases due to decreased signal amplitude from higher signal attenuation of water (paragraph 41 and FIG. 5). In addition, the patent does not disclose methods for using a RFID tag network to determine the geometry of the fracture system at distances of hundreds of meters from the borehole.

U.S. patent application Ser. No. 12/575,866 by Bailey et al. (Publication number 2010/0044034) discloses a subsurface tagging system with wired tubulars. While the application discloses the use of RFID in the wellbore, the methods disclosed are designed to be used in conjunction with a drilling rig during the well construction stages which include well casing installation and cementing. Therefore, the methods disclosed are not applicable to mapping induced fractures that are created during stimulation treatments by hydraulic fracturing.

Application Ser. No. 12/575,866 by Bailey et al. cites two patents for inclusion in their disclosure: U.S. Pat. No. 6,577,244 B1 METHOD AND APPARATUS FOR DOWNHOLE SIGNAL COMMUNICATION AND MEASUREMENT THROUGH A METAL TUBULAR (Clark et al.) and U.S. Pat. No. 6,993,432 B2 SYSTEM AND METHOD FOR WELLBORE COMMUNICATION (Jenkins et al.).

The U.S. Pat. No. 6,577,244 by Clark et al. discloses methods for use of drilling tubulars adapted to accept a run in tool (RIT) and a specially designed drill collar which is referred to as a sub in the patent. The patent also discloses methods for use of and electromagnetic RIT which is lowered or pumped down through the drill string until it reaches a landing shoe in the sub.

While Clark et al. discuss the use of logging tools and use of radio frequency, the disclosure does not describe the use of RFID tags. Moreover, the methods discussed by Clark et al. require the use of a rig at the well site to deploy the RIT and tubulars. This makes the use of the methods impractical for monitoring conditions during a well stimulation project because after each stage of stimulation project, the rig would have to be moved on to the well following removal of the hydraulic stimulation equipment. Subsequently, the rig would have to be moved off the well and the hydraulic stimulation equipment moved back onto the well head and surrounding area. This process would have to be repeated after each stage of stimulation and would result in extraordinary costs to the well operator and is not operationally practical.

The U.S. Pat. No. 6,993,432 by Jenkins et al. discloses methods for communication using vessels which can include RFID tags within an enclosure. The Jenkins, et al. patent discloses methods centered on processes for circulating the vessels back to the surface after the vessels have been pumped downhole during various stages of drilling the well. Using borehole fluids as a method for transport of the RFID tags back to the surface, a detecting system comprised by a reader and processing unit may be used to ascertain downhole conditions at the depth of the borehole the vessels were released during drilling of the well.

Since the disclosures discussed in the Detailed Description section of this application involve the process of hydraulic fracturing which occurs after the well has been drilled and a casing inserted into the well with or without cement pumped into the annular space around the casing, the processes disclosed in the patent of Jenkins et al. are not applicable to the process of mapping induced fractures that are created during the well stimulation process.

U.S. Pat. No. 8,931,553 discloses electrically conductive proppant and methods for detecting, locating and characterizing the electrically conductive proppant. Since the methods disclosed in U.S. Pat. No. 8,931,553 uses electric and magnetic measurements of the conductive proppant within the subsurface, the wavelengths of the electromagnetic waves are extremely long. Therefore the geometry of the fractures cannot be measured and mapped precisely. Instead a nebulous cloud representing the approximate distribution of the conductive proppant is obtained. In addition, formations containing oil and gas generally contain disseminated metals especially pyrite which would produce erroneous maps of conductive proppant.

U.S. Pat. No. 9,187,993 B2 discloses methods of employing and using a hybrid transponder system for long-range sensing and 3D localization. The methods disclosed in U.S. Pat. No. 9,187,993 B2 utilize a downhole reader and hybrid tags which are designed to transmit acoustic pulses relaying their location information to the downhole reader, thereby, acoustically relaying data to map hydraulically induced fractures. In the disclosures, the reader is described as emitting a radio frequency (RF) pulse designed to activate the hybrid tag which transmits an acoustic signal back to the reader. The patent states that the communication range of the reader-interrogator is 100 meters or more (paragraph 11). However, since the disclosures herein pertain to an RFID network that does not use acoustic transponders, most if not all of the methods described in U.S. Pat. No. 9,187,993 B2 are irrelevant U.S. patent application Ser. No. 12/145,726 by Verret et al. discloses the use of an RFID tag entrained in fluid for the purposes of locating at least one RFID tag and use of the fluid entrained with at least one RFID tag as a tracer fluid. The application also discloses the use of a RFID reader housed on a drill string or casing string to obtain data from the tag. However, as discussed in U.S. Pat. No. 9,201,157 the configuration with a reader in the wellbore or casing has a limited distance of communication, perhaps tens of meters, for performing data acquisition from the distributed tags. Therefore, the methods disclosed are not suitable for mapping an extensive system of induced fractures created during the well stimulation.

U.S. patent application Ser. No. 14/067,676 by Lazerev et al. discloses the methods for using RFID devices during the drilling of a well. In particular, the methods center on usage to control downhole tools that are operating during various well drilling operations.

Since the disclosures discussed in the Detailed Description section of this application involve the process of hydraulic fracturing which occurs after the well has been drilled and a casing inserted into the well with or without cement pumped into the annular space around the casing, the processes disclosed in the patent of Lazerev et al. are not applicable to the real-time process of mapping induced fractures that are created during the well stimulation process.

U.S. patent application Ser. No. 14/787,730 by Varney et al. The disclosure in Varney et al. is designed to track drill bit cuttings that are created during the drilling of a well. Therefore, the methods disclosed are not applicable to mapping induced fractures created by the hydraulic fracturing stimulation treatments because the well is cased and possibly cemented prior to stimulation.

Although great strides have been made as seen above, considerable shortcomings remain. An improved method is needed.

SUMMARY OF THE INVENTION

The invention described in this document is based on two mission critical systems. The first system uses a method to transmit electrical current into subsurface layers of the earth thereby creating an electrical field in the target zone of hydraulic fracturing. The current transmitted into the subsurface delivers the electrical current necessary to power the RFID sensor network so that the sensors can send data to a downhole receiver which records communications from the RFID network. The second system is both a receiver system and simultaneously, in one embodiment, a transceiver system comprised by the downhole tool. In either configuration, the downhole tool receives and transcribes data from the RFID network to the surface. The downhole tool communicates the data to a surface logging unit or to a virtual logging unit via satellite transmission. The logged data is then further processed to determine the subsurface locations of RFID tags comprising the subsurface network. Both systems are considered primary, mission critical systems, because communication within the RFID network cannot occur without power and a device (the downhole tool) to receive data from the RFID tags distributed in the subsurface (the RFID network).

The more important features of the systems and methods have thus been outlined in order that the more detailed description that follows may be better understood and to ensure that the present contribution to the art is appreciated. Additional features of the system and method will be described hereinafter and will form the subject matter of the claims that follow.

Many objects of the present system and method will appear from the following description and appended claims, reference being made to the accompanying drawings forming a part of this specification wherein like reference characters designate corresponding parts in the several views.

Before explaining at least one embodiment of the system and method in detail, it is to be understood that the system and method is not limited in its application to the details of construction and the arrangements of the components or steps set forth in the following description or illustrated in the drawings. The system and method is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system and method. It is important, therefore, that the claims be regarded as including such equivalent constructions insofar as they do not depart from the spirit and scope of the present system and method.

DESCRIPTION OF THE DRAWINGS

The novel features believed characteristic of the application are set forth in the description. However, the application itself, as well as a preferred mode of use, and further objectives and advantages thereof, will best be understood by reference to the following detailed description when read in conjunction with the accompanying drawings.

While the application is susceptible to various modifications and alternative forms, specific embodiments thereof have been shown by way of example in the drawings and are herein described in detail. It should be understood, however, that the description herein of specific embodiments is not intended to limit the application to the particular forms disclosed, but on the contrary, the intention is to cover all modifications, equivalents, and alternatives falling within the spirit and scope of the application as described herein.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method in accordance with the present application overcomes one or more of the above-discussed problems commonly associated with conventional reservoir systems and filtering methods. In particular, the techniques described in this disclosure will lead energy companies to a better understanding of how stimulation development occurs in differing rock types through time and space leading to greater efficiencies in both reservoir and oilfield development.

The system and method will be understood as to its operation, from the accompanying drawings, taken in conjunction with the accompanying description. It should be understood that various components, parts, and features of the device may be combined together and/or interchanged with one another, all of which are within the scope of the present application, even though not all variations and particular embodiments are shown in the drawings. It should also be understood that the mixing and matching of features, elements, and/or functions is expressly contemplated herein so that one of ordinary skill in the art would appreciate from this disclosure that the features, elements, and/or functions of one embodiment may be incorporated into another embodiment as appropriate, unless otherwise described.

Referring now to FIGS. 1-5 in the drawings, various graphics and schematics are provided. A purpose of this invention is to develop RFID tags that can be used during reservoir stimulation projects so that the tags are placed into the formation being stimulated by entrainment within the material used to hydraulically fracture the formation (FIGS. 1-5). Since the tags are entrained with the material used to fracture the formation, data from the tags can be used to map the placement of fluids and solids used for the reservoir stimulation.

By mapping the placement of fluids and solids used for the reservoir stimulation, a greatly needed function of mapping the structure of hydraulically induced fractures is accomplished. The induced fractures may interact with naturally occurring fractures in the near wellbore region (0-100 meters from the borehole) as well as those at much greater distances. In addition, the induced fracture network at much greater distances from the borehole (as much as a thousand meters or more) will also be mapped where ever the stimulation fluids and RFID tags have been placed.

An important benefit of entraining the RFID tags within the fracturing fluids/proppant is that the RFID tags will enable mapping of fractures too small to be detected by microseismic methods. Another important benefit is that RFID signals from all of the induced fractures will enable mapping of tensile fractures related to the reservoir stimulation processes. Currently, tensile fractures cannot be accurately mapped with industry standard microseismic technology.

The invention described herein relies on two mission critical systems. The first is a method to power the RFID tag network (System 1). The second system (System 2) records data from the RFID tag network. These systems are independent of each other but must operate in a unified manner to enable mapping of induced fractures that contain the RFID tag network.

System 1 uses a method to transmit electrical current into the subsurface. The current transmitted into the subsurface creates an electrical field in the target zone which serves as the power source for the RFID sensor network. Once the RFID sensor network has power, the RFID sensors can transmit data to a downhole receiver/transceiver system (System 2) which is designed to receive a specific communication protocol from the RFID network.

While there have been many systems previously proposed to power RFID tags in the subsurface, none can power the tags at distances exceeding several tens of meters from the device which is used to both power the RFID tags and receive data from the RFID tags (the device is referred to as a reader or interrogator). Herein, separated power systems for the RFID tag network (System 1) and the RFID reader (System 2) are described. As described in this document, System 1 can provide power to RFID tags over unlimited distances from the reader. In fact, the only limiting condition on providing power to the RFID tags is the constraint imposed by environmental factors such as available well locations or other necessary locations needed for the logistical placement of the infrastructure required to provide the transmission of electrical current into the subsurface.

The geophysical method for supplying current that can power the RFID network over distance of several thousand feet and more is commonly referred to as the electromagnetic (EM) method. There are many EM methods available for mineral exploration. In particular, a method originally described by Conrad Schlumberger in 1912 serves as the archetypal example for surface injection of electrical current that penetrates deeply into the layers of the earth. Numerous variations of Schlumberger's original technique have been devised with the goal of injecting current into the earth and measuring a response using equipment designed specifically for the exploration purpose at hand.

For purposes of this invention, subsurface mapping of induced hydraulic fractures using RFID tags located within induced fracture networks requires that sufficient electrical current be injected at the surface so that the current penetrates the geologic layers containing the zone of induced fractures. The injected current is then received by the RFID tag network, and used as a power source to provide current to the RFID network for any length of time needed to conduct the mapping of induced fractures. The injected current can be supplied over many time intervals during which the current is activated and then shut off as many times as needed to power the RFID network. These intervals may correspond to stages of hydraulic fracturing or other selected time intervals of interest since the RFID network is programmed to be powered on and subsequently shut down using the specific communication protocol used by the RFID network.

The RFID tag network may also be powered on during time intervals of post-stimulation and post-production. Data acquisition during these intervals may include a variety of parameters focused on measurements of reservoir characteristics. The post-stimulation and post-production measurements taken by the RFID tags would lead to a better understanding of temporospatial reservoir production and drainage. The knowledge gained from post-stimulation and post-production RFID tag data analysis can lead to optimization of hydraulic fracturing techniques used in a specific oilfield with a certain stratigraphic framework. Consequently, the knowledge gained from tag placement data in one oilfield will eventually aid optimization of the development of different oilfields having the same or similar stratigraphic frameworks.

The design of the injected current used in this invention is unique among RFID tag methods because the electrical current injected at the surface (or subsurface locations) is an electromagnetic (EM) wave the frequency of which can be varied to suit site-specific geology. Generally, but not necessarily, this invention uses a frequency in the radio wave band to power the RFID tag network. The EM wave frequency can be adjusted to accommodate changes in the local geology at the project site based on testing at the site. When the EM wave frequency of the injected current has to be changed, the frequency of the RFID tag network is adjusted accordingly in the manufacturing process. In addition to using options such as a single low frequency radio (LFR) wave to power the RFID tag network, the injected current can be adjusted to comprise any frequency in the EM spectrum such as low frequency EM (LFEM) waves or microwaves.

This invention may inject current which alternatively uses a LFR wave that acts as a "carrier" wave for additional high frequency wave content (the "rider") specifically designed to communicate to RFID tags at a frequency that is different from the frequency used by the RFID tag network to communicate back to the reader. In addition, the LFR wave current that powers the RFID tag network may be sent with additional frequency content which is described in geophysical techniques as a "chirp" that is encoded with additional frequency bandwidth used for communicating commands to and within the RFID tag network. The chirps can also be designed to signal the RFID tag network to perform specific communication protocols that are transmitted back to the reader. Alternatively, the LFR wave may be encoded with additional frequency content to create a pulse-width modulated waveform used to signal the RFID network to perform network tasks. These communication techniques are only given as examples because there are innumerable alternatives for digital signal processing methods to derive suitable communication protocols for delivering commands to the network.

An additional method for electrical current injection as a means to provide power to the RFID tag network is the use of Tesla coils. An advantage of using Tesla coils for powering downhole devices is that there is no need to energize the well casing and possibly harm people coming in contact with the well head due to electrical current energizing the well. As a method to power downhole devices, Tesla coils offer additional advantages when environmental limitations occur. Environmental limitations such as the occurrence of massive or disseminated sulfide bodies occurring in the strata above the induced fractures may require the use of Tesla coils. In addition, logistical limitations such as the presence of large metallic bodies like refineries or scrap yards may interfere with the surface infrastructure for electrical current transmitters. In cases such as these, Tesla coils may be used to inject current into the earth by lowering the coils into wells adjacent to the zone of induced fracturing. After placement of the Tesla coils, they may be used to provide electrical current to power the RFID network via the EM frequency generated by one or more Tesla coils. For purposes of this invention, the Tesla coils are designed to emit EM waves at a specific frequency or in the case of "chirps" a specific bandwidth. Whether used to emit specific frequencies or a bandwidth of specified frequencies, the Tesla coil(s) would be powered via a cable attached to a tool designed to receive power from the cable. The tool attached to the cable would be designed to use power from the cable to run the Tesla coil or in the case of many wells, the power from many cables would be used to run many Tesla coils in several adjacent wells. The cable attached to the tool housing is given electrical power by the "logging truck" or similar structure (logging unit) which is described in more detail below.

The second mission critical system is System 2. System 2 comprises the equipment that receives data from the RFID tag network. It can consist of either a receiver or a transceiver system deployed in a downhole toolset. In either configuration, the downhole toolset receives data from the RFID network and transmits data to the surface logging unit where it is interpreted.

In traditional configurations, the downhole toolset is deployed by a "logging truck" which is commonly known in the industry, and is generally built to lower an extremely heavy load of cabling and associated downhole equipment into a well. The cabling is connected to the toolset and associated downhole equipment which can be considered to be a sensor package consisting of one or more downhole tools comprising an electronic system designed to collect various forms of data. Alternatively, the downhole toolset may be deployed by a coiled tubing (CT) unit.

Once the downhole toolset communicates the data from the RFID network to the surface logging unit, which can be a "logging truck", CT unit, or a "virtual logging unit" via satellite transmission, it is recorded and archived by the logging unit. The logged data is processed in real-time to determine the subsurface locations of RFID tags comprising the RFID network in the subsurface fracture(s). Alternatively, the logging truck can record and archive the data for processing at a later time if real-time mapping of the fracture system is not required. It should be noted that if a virtual logging unit is used to log the data, there is still a requirement that a surface power supply be located at the wellhead to provide electrical power to the reader via cable deployed downhole to the reader.

Figure 1:
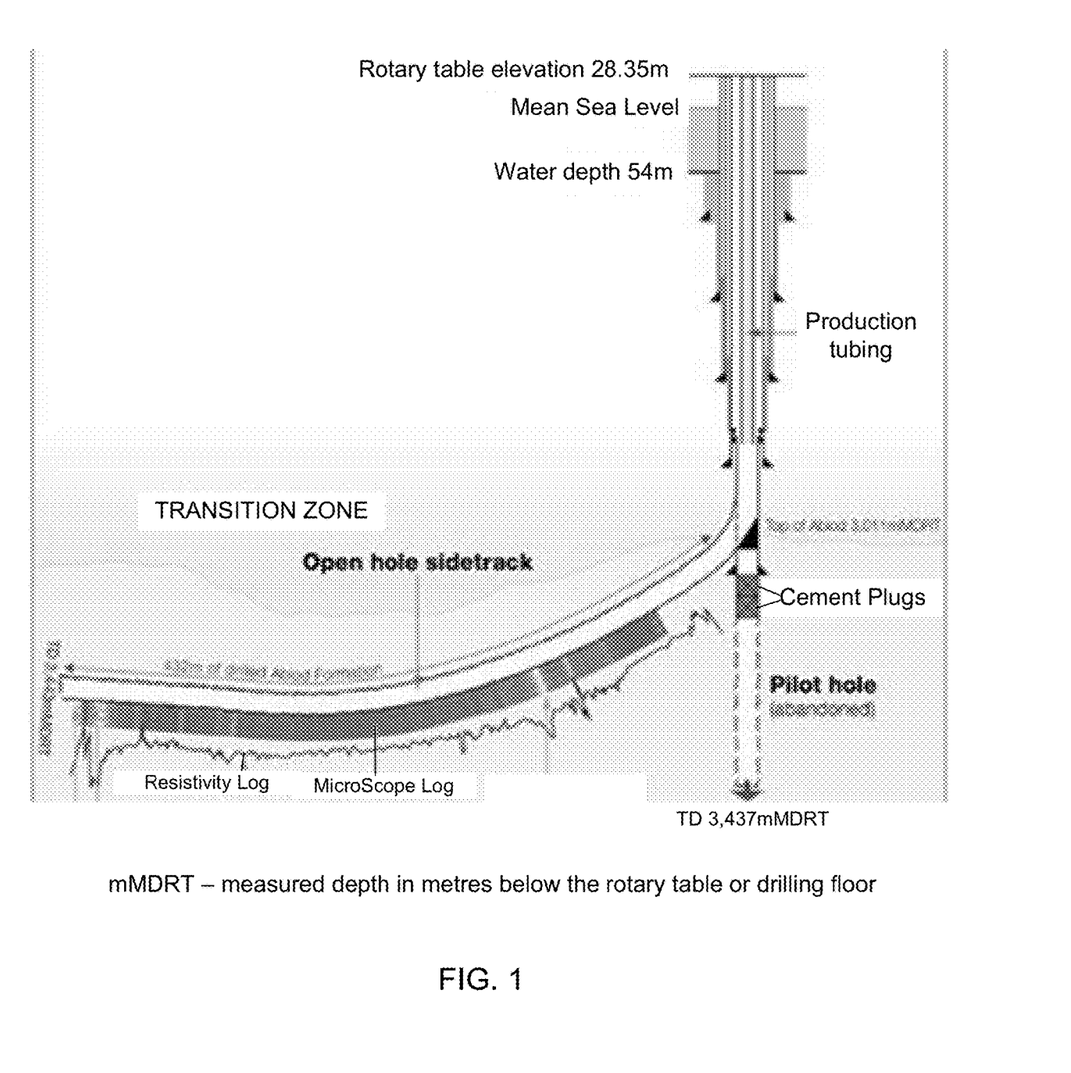
FIG. 1 is a schematic of a horizontal or deviated wellbore that has been drilled below an intermediate casing depth, but has not had casing inserted or cemented in place yet.
Figure 2:
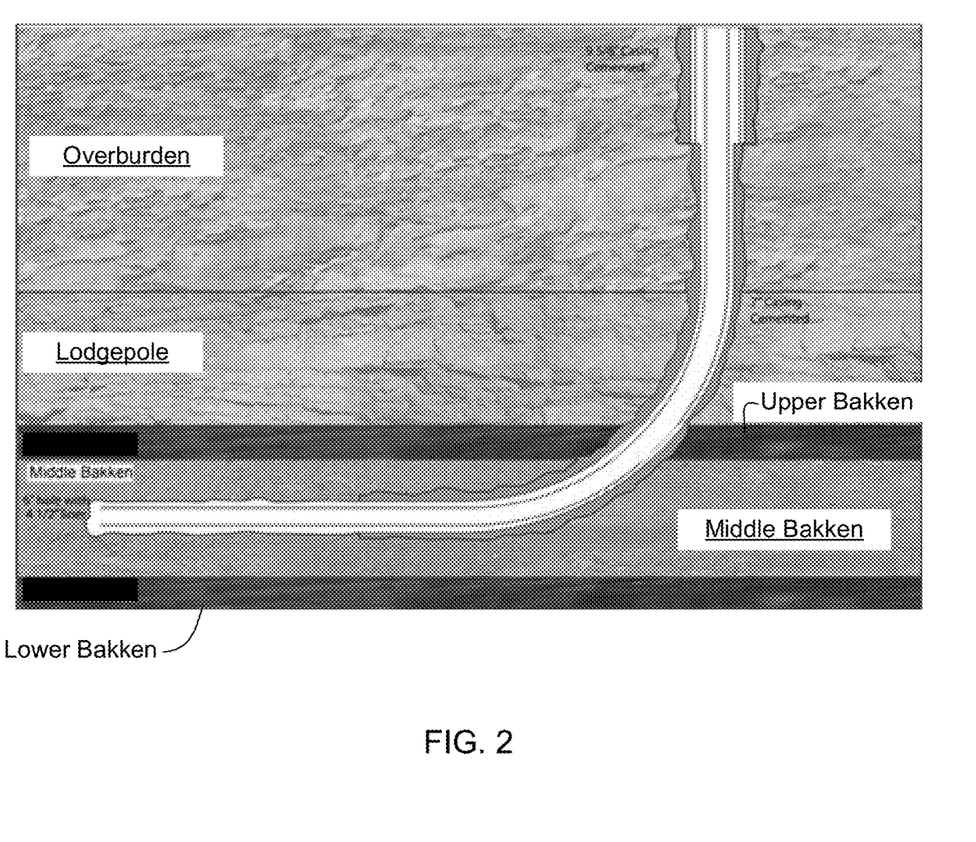
FIG. 2 is a schematic of a horizontal well where the casing has been inserted and cemented in place.
Figure 3A:
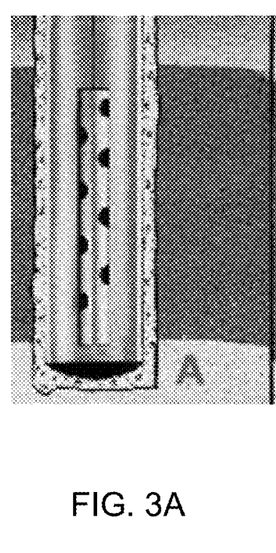
FIG. 3A shows perforating guns lowered into place prior to firing and perforating the casing (and cement sheath).
Figure 3B:
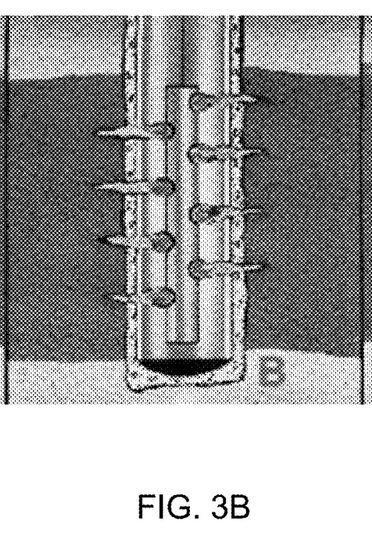
FIG. 3B shows the perforating guns of FIG. 3A at the point of firing that sets off the shape charges and subsequently perforate holes through the casing and cement sheath creating a conduit between the wellbore and rock formation prior to hydraulic fracturing.
Figure 3C:
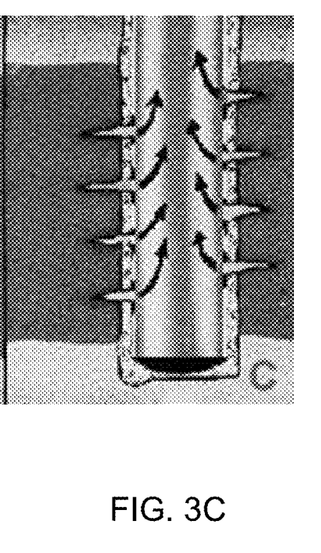
FIG. 3C shows the perforated pathway created through FIGS. 3A and 3B between the wellbore and reservoir which allows flow of fluids into, or in the case of hydraulic fracturing, out of the wellbore and into the rock formation.
Figure 4:
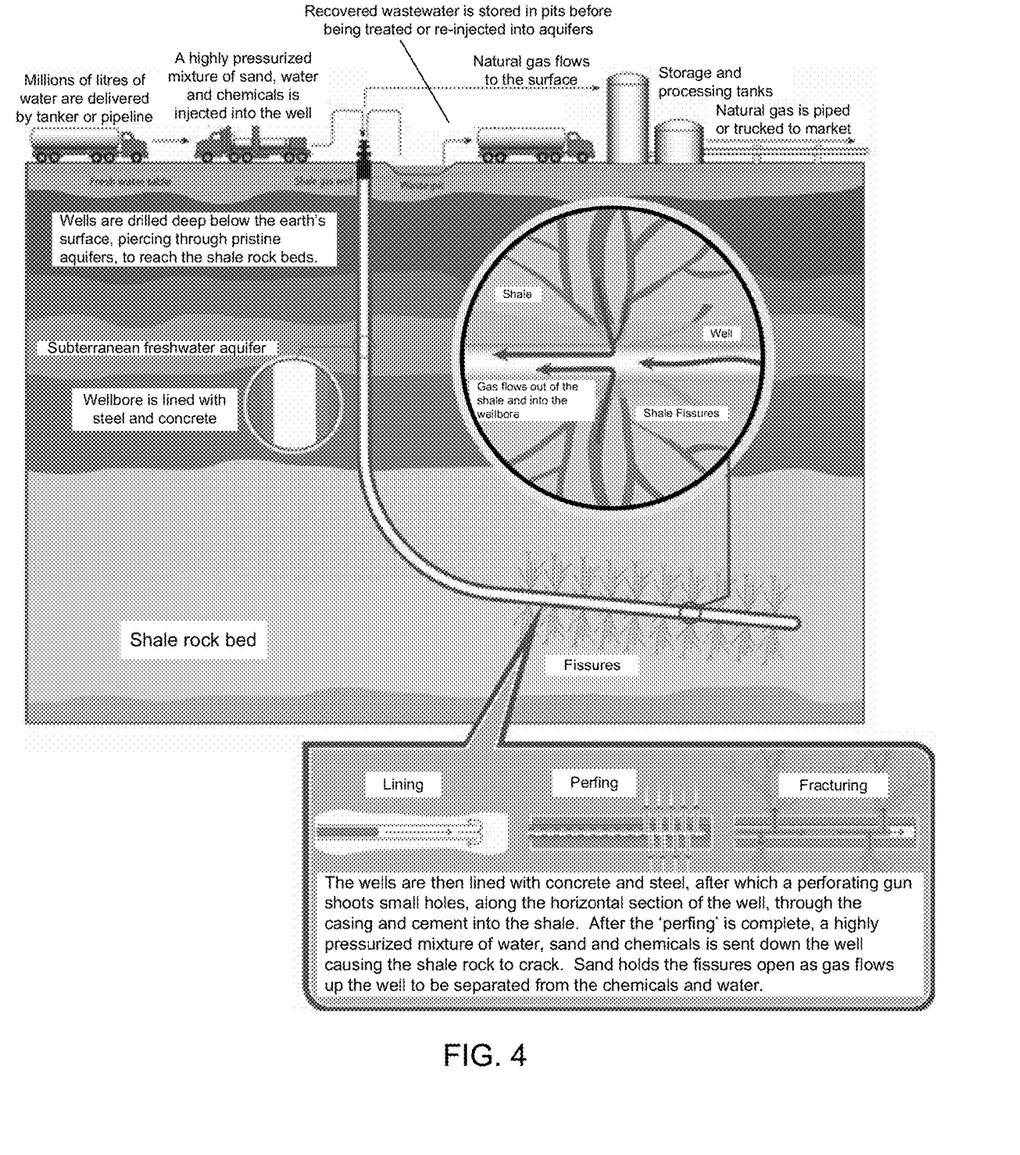
FIG. 4 is a graphic that shows the hydraulic fractures that have been created after a stimulation job (not to scale) and the fractures within the rock that would be imaged with the methods and technology described in the present patent application.
Figure 5:
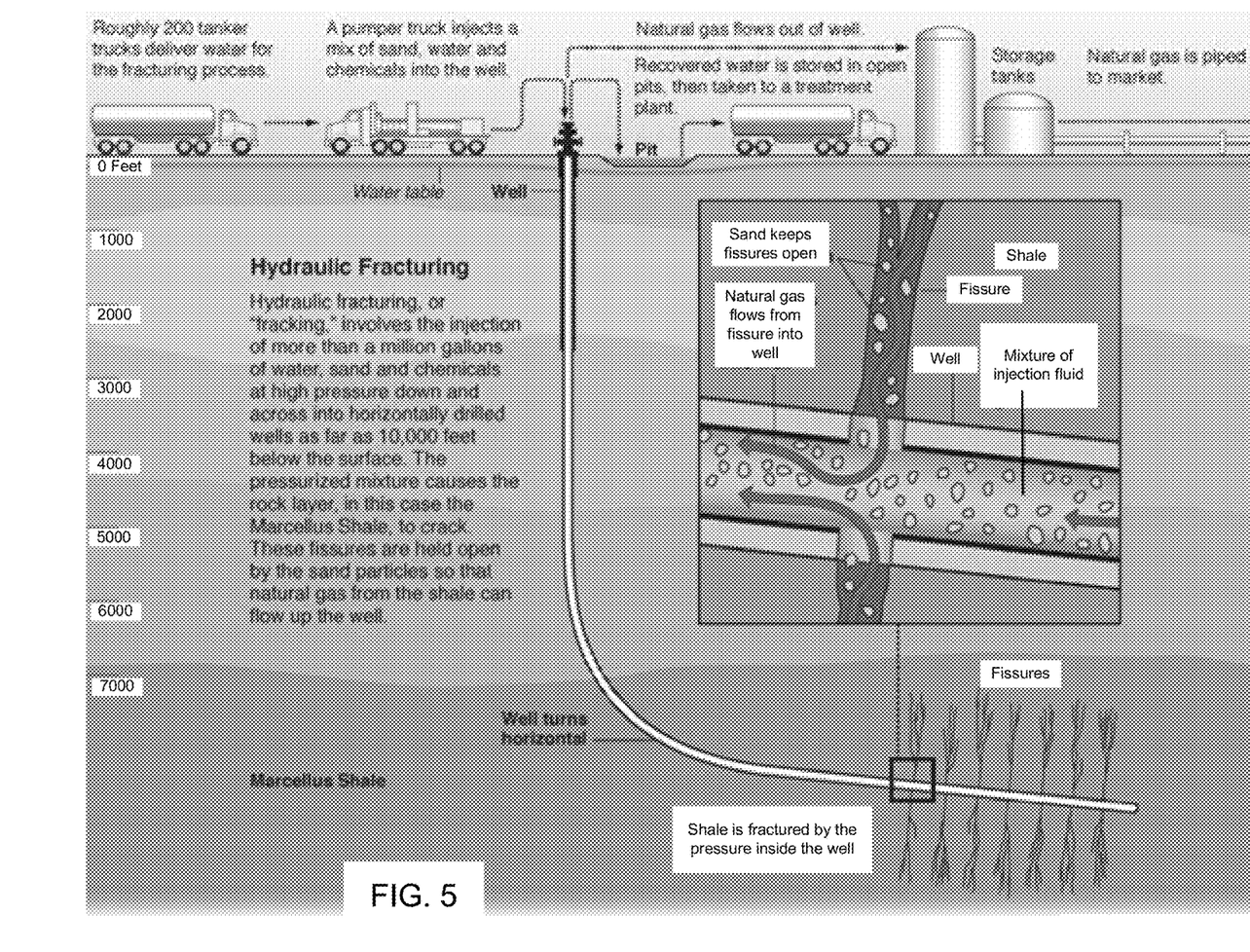
FIG. 5 is a graphic depicting the hydraulic fracturing crew on the surface pumping a water-based fracturing fluid with sand/proppant particles into the rock formation to create hydraulic fractures and increasing the overall water content. Some of the proppant being replaced by coated RFID tags and placed into the hydraulic fracture in the same manner to be located later or in real-time by the down-hole tool inserted into the well in accordance with the present application.
Figure 6A:
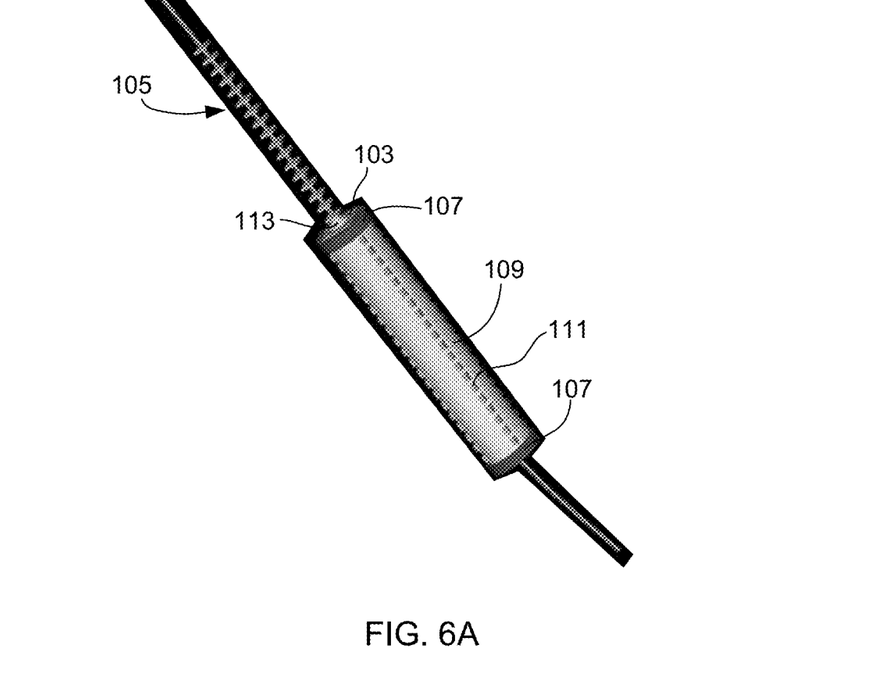
FIGS. 6A and 6B shows an exemplary embodiment of a downhole toolset used in accordance with the method of the present application.
Figure 6B:
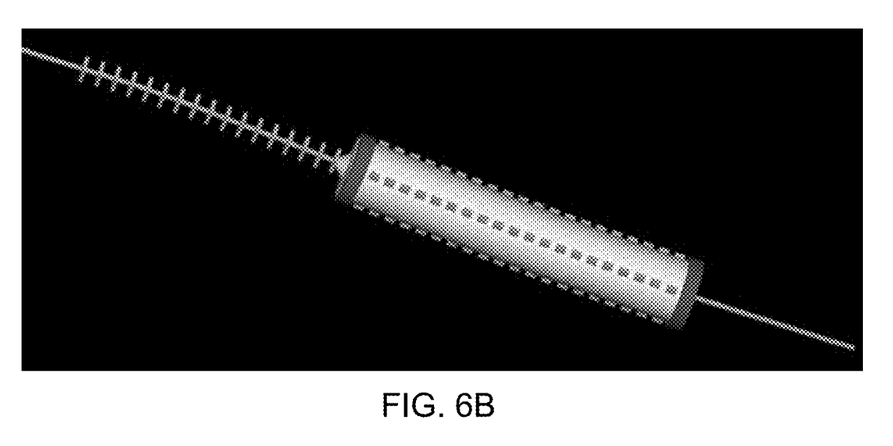

Referring now also to FIGS. 6A and 6B in the drawings, an exemplary embodiment of the downhole toolset is illustrated. As seen in FIGS. 6A and 6B is one of many possible configurations for a downhole toolset. The downhole toolset is designed to collect data from the RFID network. The first sampling station for the toolset is the large square 103 at the front of the toolset. Future sampling stations 105 are the small squares in front of the toolset. The sampling station spacing for measurement of the reservoir RFID network is independent of the spacing of the sensors within the toolset. The toolset anode and cathode are the cylinders 107 at the front and rear of the toolset body 109. The anode and cathode system may be used to inject electrical current into the subsurface for broadcasting specific communication protocols to the RFID network (PWM or chirp signals are examples of formats that may be used). The toolset anode and cathode are separated by alternating disks within body 109 comprised of insulators and conductors (traditional metal conductors, semi-conductors, or superconductors). The rectangles on body 109 represent a series of nodes 111 for the toolset. The nodes may be used to position a variety of interchangeable hardware tools that comprise subsystems for the toolset. In one embodiment the nodes may comprise a system of emitters for use in the transceiver/receiver system. Spacing for the sensors can be set for optimal data acquisition according to the media being sampled. Sensor spacing within the toolset may be configured via software that enables or disables sensors as needed. The cone 113 between the first sampling station 103 and the first sampling station 105, adjacent to the cylinder 107 of the toolset, represents the primary reader which may be an agile reader depending on the deployment configuration.

The downhole toolset (FIG. 6) can have a variety of tools connected to one another with the general design of providing electrical connections from one to another via the primary electrical supply from the cable of the logging truck. In general, the logging truck supplies power to the downhole tools housing various instruments which communicate data back uphole to the truck via the same cable that is used to supply electrical power to the downhole toolset. In the design of this invention, the electrical power supplied to the downhole toolset is used to power the RFID reader system and the various instruments associated with the reader. Neither the logging truck nor the reader supplies electrical power to the RFID network so as to eliminate self-jamming.

Self-jamming is a problem caused when the reader uses the same frequency to power the RFID tags that the RFID tags use to send data back to the reader. Communication from the RFID tags to the reader is not possible unless the RFID tags are able to generate higher amplitude signals at the reader's frequency so the reader can detect the tag data above the level of the frequency the reader is broadcasting. To enhance signal reception and transmission, the tags maybe constructed of superconducting materials (such as gallium arsenide or gold). By using a different radio wave frequency to power the RFID tag network as compared to the reader's radio frequency wave used to receive data, the self-jamming problem is eliminated. In addition, greater distances are obtained for both reader detection of RFID tag signals and tag detection of signals sent by the reader because lower amplitude signals can be detected on both frequencies (channels) due to the lack of the interference caused by the presence of a broadcast frequency at arbitrary levels necessary to maintain two-way communication using the same frequency.

As described above, the problem of self-jamming between the reader and the RFID tag network can be eliminated by using different frequencies to transmit data in one direction (reader to tag) as compared to the opposite direction (tag to reader). In the following discussions the use of separate frequencies for communication purposes will be noted as separate channels such that frequency f1 used to transmit data out from the reader to tag is on one channel (channel 1) and the frequency f2 used to transmit data in from the tag to the reader is on another channel (channel 2). This invention uses multiple frequencies as a method to provide many channels for communication with the RFID network. In addition, the RFID network is comprised not only of the reader and the RFID tags which use high frequency radio wave (HFR) methods but also includes the EM wave that is injected to the subsurface. The communication frequencies used by the RFID tags and reader are custom designed for the application so they can span frequencies anywhere in the frequency band.

Previous publications describe methods for characterization and evaluation of RFID network performance. While this invention does not use the network design or protocols described in previous publications, there are examples of network topologies that can be utilized for a specific purpose. The methods described in this invention use a network design in which separate frequencies are used for communication channels. Each communication channel can be thought of as a separate topology. In addition to using various topologies within the network, RFID tags with sensors, microcontrollers, or SoC (System on Chip) devices may also be deployed and used for a variety of purposes such as the formation of a linear array to communicate with portions of the RFID network.

The RFID tags to be used as part of the system described in this invention are unique in three additional ways that provide significant advantages compared to those described in prior art. First, the RFID tags are armored (coated in a protective sheath) so that the tags can withstand the high pressures and temperatures associated with hydraulic fracturing, and the formation conditions after the fracturing treatment. Second, to alter the density of the RFID tags to imitate the water and sand conveyance, and third, to create RFID tags of sizes and shapes similar to the proppant being used for the stimulation.

Prior patents related to RFID tags being placed into formations for various purposes have not recommended coating the RFID tags in any protective coating or jacket. The intent of this invention is to use RFID tags that have been coated in a polymer based (or other material) coating to ensure that the tags can withstand the harsh environmental conditions of being pumped with sand particles into the deep formations under high pressures and temperatures. The coatings will include any type of material that will allow the incoming and outgoing signals to be transmitted and received without significant impedance or attenuation such as ceramic coatings.

Second, the RFID tags used in this system are designed to have two specific, but not exclusive, densities and should be capable of matching any density. One group having the same density as water and the second group having the same density of sand (S.G. 2.65) to simulate the settling of the proppant during stimulation and to allow transport as far as possible with the tags that have the density of water. This will be controlled during the coating process using proper materials to ensure density conformity.

Third, RFID tags used in this system are designed to be approximately the same size as the proppant. The final size can be changed by adjusting the amount of coating applied to the RFID tags to match the proppant size used in the stimulation. Currently, RFID tags as small as 5 mm are being manufactured. As part of the development of technologies described herein, the inventors expect to manufacture RFID tags much smaller in diameter.

A summary of invention technologies not found in prior art is discussed below. The technologies of the present application have particular advantages over the prior art. Compared to the limitations of methods described in prior art, there are many advantages in using the methods disclosed in this document. Without incorporation of the methods described herein, usage of RFID tags as described in prior art would not produce viable data for monitoring changes in the reservoir during reservoir stimulation. This is primarily because the excessively large size of the RFID tags described in prior art would result in their destruction either while they are entrained in the stimulation fluid or while they are carried in the highly abrasive and highly corrosive environment that the stimulation fluid undergoes as it travels from the surface through the borehole and into the formation. The reality is that RFID tag deployment described in prior art would result in tags that are much larger than the size of the sand in the proppant and would therefore be too large to survive the travel path from the borehole perforation into the formation. Consequently, prior art disclosures would result in the RFID tags being trapped in the near-borehole area of the formation. Subsequently, the RFID tags would be eroded and destroyed by the sand carried within the stimulation fluid or the corrosive stimulation fluid itself.

In addition, prior art does not describe methods for protecting RFID tags with an "armor" or some other type of protective coating. Therefore, implementations of RFID tags described in the prior art would be rendered useless in hydraulic stimulation environments because the sand used during stimulations would simply erode and destroy unarmored tags during the placement of the proppant and entrained tags, the corrosive fluids would destroy the unarmored tags, or the tags could electrically short out.

The methods described in this disclosure regarding current injection into surface or near-surface strata allow distribution of electrical power to the RFID tags and tag network. Consequently, the tags and any tag network would not have to rely on the tag reader as a power supply to activate the tags. As a result, a much greater range of communication between the tag reader and tags is possible.

As described previously, using a software interface to create a network of RFID tags that communicate, allows for greater read ranges of RFID tags since signals will be sent back to the reader tool in the wellbore via the RFID tag network. This will improve the location accuracy of the furthest RFID tags due to the increased number of receiving nodes (separate RFID tags as nodes) that can aid three dimensional locations of the individual RFID tags.

By manufacturing separate types of RFID tags to match the density of sand and water, a more complete picture of the stimulation development will be created from the standpoint of understanding in-situ proppant settling and fluid efficiencies.

The methods described in this disclosure allow for both post-job acquisition of data and also real-time acquisition of data. However, the real-time acquisition of data allows a better understanding of the development of proppant distribution over time and any associated microseismic activity.

Figure 7:
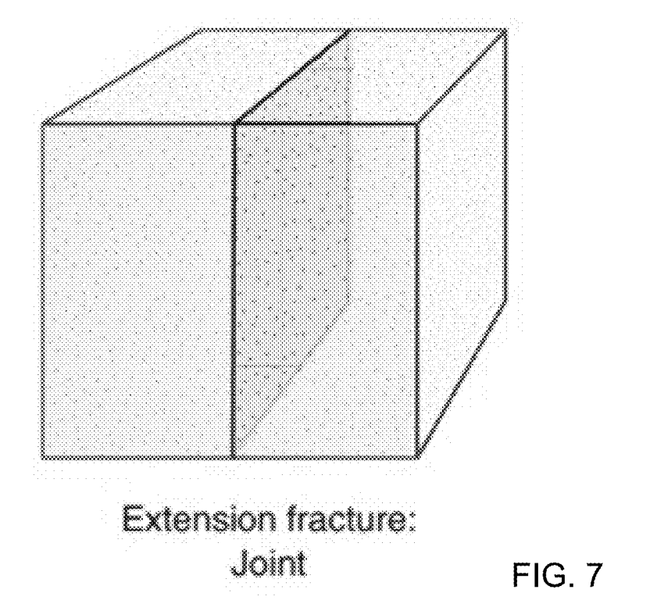
FIG. 7 shows an extension fracture in which movement is primarily perpendicular to the face of the fracture represented the black plane between the two blocks. The movement is primarily a separation of the two blocks.
Figure 8:
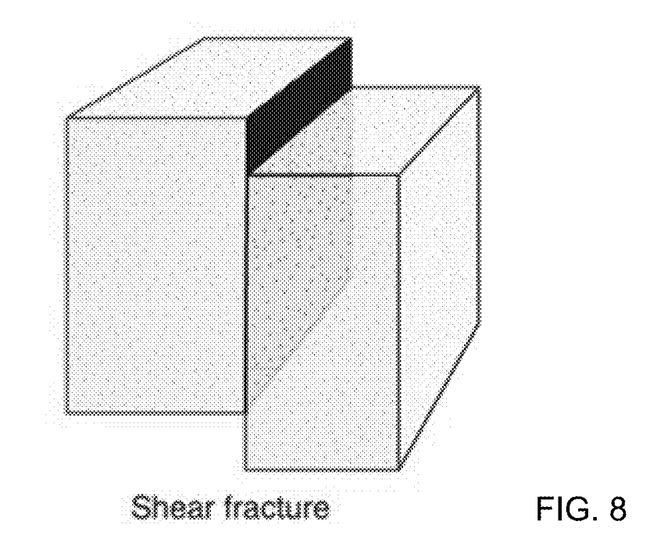
FIG. 8 shows a shear fracture in which movement is primarily parallel to the face of the fracture represented the black plane between the two blocks.

Referring now to FIGS. 7 and 8 in the drawings, graphics of types of fractures are illustrated. The methods described in this disclosure have an advantage over currently used methods of microseismic monitoring since mapping of RFID tag placement allows the mapping of sand placement. In addition, mapping of RFID tag placement allows mapping of both tensile fractures (dominantly dilatational displacement, FIG. 7) and shear fractures (dominantly shear slip displacement, FIG. 8). Currently, microseismic monitoring techniques cannot map tensile fractures but only shear fractures. As a result, microseismic monitoring techniques provide only a partial mapping of fracture development with the inherently large errors in fracture location as discussed in the introduction.

Real-time data monitoring of RFID tag placement during reservoir stimulation leads to an improved understanding of completions including perforation or wellbore opening size, and the style and placement of perforations. A better understanding of the technical design for these parameters leads to improved completion efficiencies and ultimately recoverable reserves from the formation stimulation processes. Real-time data monitoring would also allow for stimulation treatment adjustments "on the fly" to improve stimulation designs based on data received from the RFID network.

Post-stimulation and post-production data acquisition (with various measurements taken by the RFID tags) would lead to a better understanding of temporospatial reservoir production and drainage. The knowledge gained from post-stimulation and post-production RFID tag data analysis can lead to optimization of hydraulic fracturing techniques used in a specific oilfield with a certain stratigraphic framework. Consequently, the knowledge gained from tag placement data in one oilfield will eventually aid optimization of the development of different oilfields.

Therefore, the techniques described in this disclosure will lead energy companies to a better understanding of how stimulation development occurs in differing rock types through time and space leading to greater efficiencies in reservoir development.

It is evident by the foregoing description that the subject application has other significant benefits and advantages. The present assembly and method is amenable to various changes and modifications without departing from the spirit thereof. The particular embodiments disclosed above are illustrative only, as the system and method may be modified and practiced in different but equivalent manners apparent to those skilled in the art having the benefit of the teachings herein. It is therefore evident any alterations, modifications, and all such variations are considered within the scope and spirit of the application. It is apparent that a system and method with significant advantages has been described and illustrated.

Below are listed some definitions of terms useful in the field of technology and are beneficial as providing some potential insight to the technology and its operation.

Definitions

Active tag: An RFID tag that has a transmitter to send back information, rather than reflecting back a signal from the reader, as a passive tag does. Most active tags use a battery to transmit a signal to a reader. However, some tags can gather energy from other sources. Active tags can be read from 300 feet (100 meters) or more, but they're expensive (typically more than US$20 each). They're used for tracking expensive items over long ranges. For instance, the U.S. military uses active tags to track containers of supplies arriving in ports.

Addressability: The ability to write data to different fields, or blocks of memory, in the microchip in an RFID transponder.

Agile reader: A generic term that usually refers to an RFID reader that can read tags operating at different frequencies or using different methods of communication between the tags and readers.

Air interface protocol: The rules that govern how tags and readers communicate.

Alignment: See Orientation.

Amplitude: The maximum absolute value of a periodic curve measured along its vertical axis (the height of a wave, in layman's terms).

Amplitude modulation: Changing the amplitude of a radio wave. A higher wave is interpreted as a 1 and a normal wave is interpreted as a zero. By changing the wave, the RFID tag can communicate a string of binary digits to the reader. Computers can interpret these digits as digital information. The method of changing the amplitude is known as amplitude shift keying, or ASK.

Antenna: The tag antenna is the conductive element that enables the tag to send and receive data. Passive, low- (135 kHz) and high-frequency (13.56 MHz) tags usually have a coiled antenna that couples with the coiled antenna of the reader to form a magnetic field. UHF tag antennas can be a variety of shapes. Readers also have antennas which are used to emit radio waves. The RF energy from the reader antenna is "harvested" by the antenna and used to power up the microchip, which then changes the electrical load on the antenna to reflect back its own signals.

Antenna gain: In technical terms, the gain is the ratio of the power required at the input of a loss-free reference antenna to the power supplied to the input of the given antenna to produce, in a given direction, the same field strength at the same distance. Antenna gain is usually expressed in decibels and the higher the gain the more powerful the energy output. Antennas with higher gain will be able to read tags from farther away.

Anti-collision: A general term used to cover methods of preventing radio waves from one device from interfering with radio waves from another. Anti-collision algorithms are also used to read more than one tag in the same reader's field.

Auto-ID Center: A non-profit collaboration between private companies and academia that pioneered the development of an Internet-like infrastructure for tracking goods globally through the use of RFID tags.

Automatic Identification: A broad term that covers methods of collecting data and entering it directly into computer systems without human involvement. Technologies normally considered part of auto-ID include bar codes, biometrics, RFID, and voice recognition.

Backscatter: A method of communication between passive tags (ones that do not use batteries to broadcast a signal) and readers. RFID tags using backscatter technology reflect back to the reader radio waves from a reader, usually at the same carrier frequency. The reflected signal is modulated to transmit data.

Bar code: A standard method of identifying the manufacturer and product category of a particular item. The barcode was adopted in the 1970s because the bars were easier for machines to read than optical characters. Barcodes main drawbacks are they don't identify unique items and scanners have to have line of sight to read them.

Battery-assisted tag: These are RFID tags with batteries, but they communicate using the same backscatter technique as passive tags (tags with no battery). They use the battery to run the circuitry on the microchip and sometimes an onboard sensor. They have a longer read range than a regular passive tag because all of the energy gathered from the reader can be reflected back to the reader. They are sometimes called "semi-passive RFID tags."

Carrier frequency: The main frequency of a transmitter, or RFID reader, such as 915 MHz. The frequency is then changed, or modulated, to transmit information.

Checksum: A code added to the contents of a block of data stored on an RFID microchip that can be checked before and after data is transmitted from the tag to the reader to determine whether the data has been corrupted or lost. The cyclic redundancy check is one form of checksum.

Chipless RFID tag: An RFID tag that doesn't depend on a silicon microchip. Some chipless tags use plastic or conductive polymers instead of silicon-based microchips. Other chipless tags use materials that reflect back a portion of the radio waves beamed at them. A computer takes a snapshot of the waves beamed back and uses it like a fingerprint to identify the object with the tag. Companies are experimenting with embedding RF reflecting fibers in paper to prevent unauthorized photocopying of certain documents. Chipless tags that use embedded fibers have one drawback for supply chain uses—only one tag can be read at a time.

Circular-polarized antenna: A UHF reader antenna that emits radio waves in a circular pattern. These antennas are used in situations where the orientation of the tag to the reader cannot be controlled. Since the waves are moving in a circular pattern, they have a better chance of hitting the antenna, but circular-polarized antennas have a shorter read range than linear-polarized antennas.

Closed-loop systems: RFID tracking systems set up within a company. Since the tracked item never leaves the company's control, it does not need to worry about using technology based on open standards.

Commissioning a tag: This term is sometime used to refer to the process of writing a serial number to a tag (or programming a tag) and associating that number with the product it is put on in a database.

Concentrator: A device connected to several RFID readers to gather data from the readers. The concentrator usually performs some filtering and then passes only useful information from the readers on to a host computer.

Contactless smart card: An awkward name for a credit card or loyalty card that contains an RFID chip to transmit information to a reader without having to be swiped through a reader. Such cards can speed checkout, providing consumers with more convenience.

Coupling: See inductive coupling.

Cyclic redundancy check (CRC): A method of checking data stored on an RFID tag to be sure that it hasn't been corrupted or some of it lost (See Checksum).

Data transfer rate: The number of characters that can be transferred from an RFID tag to a reader within a given time. Baud rates are also used to quantify how fast readers can read the information on the RFID tag. This differs from read rate, which refers to how many tags can be read within a given period of time.

Data field: An area of memory on RFID microchips that is assigned to a particular type of information. Data fields may be protected (see below) or they may be written over, so a data field might contain information about where an item should be sent to. When the destination changes, the new information is written to the data field.

Data field protection: The ability to prevent data stored in a specific area of memory of an RFID microchip from being overwritten. Companies might want to protect the data field that stores an Electronic Product Code, which doesn't change during the life of the product it's associated with.

Decibel (dB): A measure of the gain of an antenna.

De-tune: UHF antennas are tuned to receive RFID waves of a certain length from a reader, just as the tuner on the radio in a car changes the antenna to receive signals of different frequencies. When UHF antenna is close to metal or metallic material, the antenna can be detuned, resulting in poor performance.

Die: The silicon block onto which circuits have been etched to create a microchip.

Duplex: A channel capable of transmitting data in both directions at the same time. (Half duplex is a channel capable of transmitting data in both directions, but not simultaneously.)

Duty cycle: The length of time the reader can be emitting energy. Regulations in the European Union say readers can be on only 10 percent of the time.

EEPROM (Electrically Erasable Programmable Read-Only Memory): A method of storing data on microchips. Usually bytes can be erased and reprogrammed individually. RFID tags that use EEPROM are more expensive than factory programmed tags, where the number is written into the silicon when the chip is made, but they offer more flexibility because the end user can write an ID number to the tag at the time the tag is going to be used.

Effective isotropic radiated power (EIRP): A measurement of the output of RFID reader antennas used in the United States and elsewhere. EIRP is usually expressed in watts.

Effective radiated power (ERP): A measurement of the output of RFID reader antennas used in Europe and elsewhere. ERP is usually expressed in watts and is not the same as EIRP.

Electromagnetic interference (EMI): Interference caused when the radio waves of one device distort the waves of another. Cells phones, wireless computers and even robots in factories can produce radio waves that interfere with RFID tags.

Electronic article surveillance (EAS): Simple electronic tags that can be turned on or off. When an item is purchased (or borrowed from a library), the tag is turned off. When someone passes a gate area holding an item with a tag that hasn't been turned off, an alarm sounds. EAS tags are embedded in the packaging of most pharmaceuticals. They can be RF-based, or acousto-magnetic.

Electronic Product Code: (EPC): A serial, created by the Auto-ID Center, that will complement barcodes. The EPC has digits to identify the manufacturer, product category and the individual item.

EPC Discovery Service: An EPCglobal Network service that allows companies to search for every reader that has read a particular EPC tag.

EPCglobal: A non-profit organization set up the Uniform Code Council and EAN International, the two organizations that maintain barcode standards, to commercialize EPC technology. EPCglobal is made up of chapters in different countries and regions. It is commercializing the technology originally developed by the Auto-ID Center.

EPC Information Service: Part of the EPC Network. The EPC Information Service is a network infrastructure that enables companies to store data associated with EPCs in secure databases on the Web. The EPC Information Service will enable companies to provide different levels of access to data to different groups. Some information associated with an EPC might be available to everyone. Other information might be available only to a manufacturer's retail customers. The service also includes a number of applications, such as the EPC Discovery Service.

EPCglobal Network (or EPC Network): The Internet-based technologies and services that enable companies to retrieve data associated with EPCs. The network infrastructure includes the Object Name Service, distributed middleware (sometimes called Savants), the EPC Information Service and Physical Markup Language.

Error correcting code: A code stored on an RFID tag to enable the reader to figure out the value of missing or garbled bits of data. It's needed because a reader might misinterpret some data from the tag and think a Rolex watch is actually a pair of socks.

Error correcting mode: A mode of data transmission between the tag and reader in which errors or missing data is automatically corrected.

Error correcting protocol: A set of rules used by readers to interpret data correctly from the tag.

European Article Numbering (EAN): The bar code standard used throughout Europe, Asia and South America. It is administered by EAN International.

Excite: The reader is said to "excite" a passive tag when the reader transmits RF energy to wake up the tag and enable it to transmit back.

eXtensible markup language (XML): A widely accepted way of sharing information over the Internet in a way that computers can use, regardless of their operating system.

European Telecommunications Standards Institute (ETSI): The European Union body that recommends standards for adoption by member countries.

Factory programming: Some read-only tags to have their identification number written into the silicon microchip at the time the chip is made. The process of writing the number into the chip is called factory programming. This data can't be written over or changed.

Far-field communication: RFID reader antennas emit electromagnetic radiation (radio waves). If an RFID tag is outside of one full wavelength of the reader, it is said to be in the "far field." If it is within one full wavelength away, it is said to be in the "near field." The far field signal decays as the square of the distance from the antenna, while the near field signal decays as the cube of distance from the antenna. So passive RFID systems that rely on far field communications (typically UHF and microwave systems) have a longer read range than those that use near field communications (typically low- and high-frequency systems).

Field programming: Tags that use EEPROM, or non-volatile memory, can be programmed after it is shipped from the factory. That is, users can write data to the tag when it is placed on a product.

Fluidic Self-Assembly: A manufacturing process, patented by Alien Technology. It involves flowing tiny microchips in a special fluid over a base with holes shaped to catch the chips. The process is designed to mass assemble billions of RFID tags at very low cost.

Frequency: The number of repetitions of a complete wave within one second. 1 Hz equals one complete waveform in one second. 1 KHz equals 1,000 waves in a second. RFID tags use low, high, ultra-high and microwave frequencies. Each frequency has advantages and disadvantages that make them more suitable for some applications than for others.

Frequency hopping: A technique used to prevent readers from interfering with one another. In the United States, UHF RFID readers actually operate between 902 and 928 MHz, even though it is said that they operate at 915 MHz. The readers may jump randomly or in a programmed sequence to any frequency between 902 MHz and 928 MHz. If the band is wide enough, the chances of two readers operating at exactly the same frequency is small. The UHF bands in Europe and Japan are much smaller so this technique is not effective for preventing reader interference.

Gain: See Antenna gain.

GTAG (Global Tag): A standardization initiative of the Uniform Code Council (UCC) and the European Article Numbering Association (EAN) for asset tracking and logistics based on radio frequency identification (RFID). The GTAG initiative was supported by Philips Semiconductors, Intermec, and Gemplus, three major RFID tag makers. But it was superseded by the Electronic Product Code.

Harvesting: A term sometimes used to describe the way passive tags gather energy from an RFID reader antenna.

High-frequency: From 3 MHz to 30 MHz. HF RFID tags typically operate at 13.56 MHz. They typically can be read from less than 3 feet away and transmit data faster than low-frequency tags. But they consume more power than low-frequency tags.

Inductive coupling: A method of transmitting data between tags and readers in which the antenna from the reader picks up changes in the tag's antenna.

Industrial, Scientific, and Medical (ISM) bands: A group of unlicensed frequencies of the electromagnetic spectrum.

Inlay: An RFID microchip attached to an antenna and mounted on a substrate. Inlays are essentially unfinished RFID labels. They are usually sold to label converters who turn them into smart labels.

Integrated circuit (IC): A microelectronic semiconductor device comprising many interconnected transistors and other components. Most RFID tags have ICs.

Input/output (I/O): Ports on a reader. Users can connect devices, such as an electronic eye to the input port so that when an object breaks the beam of the electronic eye the reader begins reading. Devices can also be connected to an output part, so that when a tag is read, a conveyor is turned on or a dock door opened.

Interrogator: See Reader.

License plate: This term generally applies to a simple RFID that has only a serial number that is associated with information in a database. The Auto-ID Center promoted the concept as a way to simplify the tag and reduce the cost.

Linear-polarized antenna: A UHF antenna that focuses the radio energy from the reader in a narrow beam. This increases the read distance possible and provides greater penetration through dense materials. Tags designed to be used with a linear polarized reader antenna must be aligned with the reader antenna in order to be read.

Low-frequency: From 30 kHz to 300 kHz. Low-frequency tags typical operate at 125 kHz or 134 kHz. The main disadvantages of low-frequency tags are they have to be read from within three feet and the rate of data transfer is slow. But they are less subject to interference than UHF tags.

Memory: The amount of data that can be stored on the microchip in an RFID tag.

Memory block: Memory on the microchip in an RFID tag is usually divided into sections, which can be read or written to individually. Some blocks might be locked, so data can't be overwritten, while others are not.

Microwave tags: A term that is some time used to refer to RFID tags that operate at 5.8 GHz. They have very high transfer rates and can be read from as far as 30 feet away, but they use a lot of power and are expensive. (Some people refer to any tag that operates above about 415 MHz as a microwave tag.)

Modulation: Changing the radio waves traveling between the reader and the transponder in ways that enable the transmission of information. Waves can be changed in a variety of ways that can be picked up by the reader and turned into the ones and zeroes of binary code. Waves can be made higher or lower (amplitude modulation) or shifted forward (phase modulation). The frequency can be varied (frequency modulation), or data can be contained in the duration of pulses (pulse-width modulation).

Multiple access schemes: Methods of increasing the amount of data that can be transmitted wirelessly within the same frequency spectrum. Some RFID readers use Time Division Multiple Access, or TDMA, meaning they read tags at different times to avoid interfering with one another.

Multiplexer: An electronic device that allows a reader to have more than one antenna. Each antenna scans the field in a preset order. This reduces the number of readers needed to cover a given area, such as a dock door, and prevents the antennas from interfering with one another.

NanoBlock: The term Alien Technology uses to describe its tiny microchips, which are about the width of three human hairs.

Near-field communication: RFID reader antennas emit electromagnetic radiation (radio waves). If an RFID tag is within full wavelength of the reader, it is said to be in the "near field." If it is more than the distance of one full wavelength away, it is said to be in the "far field." The near field signal decays as the cube of distance from the antenna, while the far field signal decays as the square of the distance from the antenna. So passive RFID systems that rely on near-field communication (typically low- and high-frequency systems) have a shorter read range than those that use far field communication (UHF and microwave systems).

Noise: Unwanted ambient electrical signals or electromagnetic energy found in the operating environment of RFID equipment. Noise can be caused by other RF devices, robots, electric motors and other machines.

Nominal range: The read range at which the tag can be read reliably.

Null spot: Area in the reader field that doesn't receive radio waves. This is essentially the reader's blind spot. It is a phenomenon common to UHF systems. Object Name Service (ONS): An Auto-ID Center-designed system for looking up unique Electronic Product Codes and pointing computers to information about the item associated with the code. ONS is similar to the Domain Name Service, which points computers to sites on the Internet.

One-time programmable tag: Also called a field-programmable tag. An RFID tag that can be written to once and read many times (see WORM).

Orientation: The position of a tag antenna vis-a-vis a reader antenna. With UHF systems, readers can be either circular-polarized or linear-polarized. When using a linear polarized antenna, the tag reader and antenna reader must be in alignment in order to achieve the longest reading distance. If that tag antenna is aligned vertically and the reader is sending out signals horizontally, only a small portion of the energy emitted by the reader will hit the tag antenna.

Passive tag: An RFID tag without a battery. When radio waves from the reader reach the chip's antenna, the energy is converted by the antenna into electricity that can power up the microchip in the tag. The tag is able to send back information stored on the chip. Today, simple passive tags cost from U.S. 20 cents to several dollars, depending on the amount of memory on the tag and other features.

Patch antenna: A small square reader antenna made from a solid piece of metal or foil.

Penetration: The ability of a particular radio frequency to pass through non-metallic materials. Low-frequency systems have better penetration than UHF systems.

Phantom read (also called a phantom transaction or false read): When a reader reports the presence of a tag that doesn't exist.

Physical Markup Language (PML): An Auto-ID Center-designed method of describing products in a way computers can understand. PML is based on the widely accepted eXtensible Markup Language used to share data over the Internet in a format all computers can use. The idea is to create a computer language that companies can use to describe products so that computer can search for, say, all "soft drinks" in inventory.

PML Server: A server that responds to requests for Physical Markup Language (PML) files related to individual Electronic Product Codes. The PML files and servers will be maintained by the manufacturer of the item. The name PML server has been replaced by EPC Information Service.

Power level: The amount of RF energy radiated from a reader or an active tag. The higher the power output, the longer the read range, but most governments regulate power levels to avoid interference with other devices.

Programming a tag: Writing data to an RFID tag. This is sometimes called "commissioning a tag."

Protocol: A set of rules that govern communications systems. (See Air-interface protocol.)

Proximity sensor: A device that detects the presence of an object and signals another device. Proximity sensors are often used on manufacturing lines to alert robots or routing devices on a conveyor to the presence of an object. They can be used in RFID systems to turn on readers.

Radio Frequency Identification (RFID): A method of identifying unique items using radio waves. Typically, a reader communicates with a tag, which holds digital information in a microchip. But there are chipless forms of RFID tags that use material to reflect back a portion of the radio waves beamed at them.

Range: See read range.

Read: The process of retrieving data stored on an RFID tag by sending radio waves to the tag and converting the waves the tag sends back into data.

Reader: A device used to communicate with RFID tags. The reader has one or more antennas, which emit radio waves and receive signals back from the tag. The reader is also sometimes called an interrogator because it "interrogates" the tag.

Reader (also called an interrogator): The reader communicates with the RFID tag via radio waves and passes the information in digital form to a computer system.

Reader field: The area of coverage. Tags outside the reader field do not receive radio waves and can't be read.

Read-only tags: Tags that contain data that cannot be changed unless the microchip is reprogrammed electronically.

Reader talks first: A means by which a passive UHF reader communicates with tags in its read field. The reader sends energy to the tags but the tags sit idle until the reader requests them to respond. The reader is able to find tags with specific serial numbers by asking all tags with a serial number that starts with either 1 or 0 to respond. If more than one responds, the reader might ask for all tags with a serial number that starts with 01 to respond, and then 010. This is called "walking" a binary tree, or "tree walking" (See Singulation).

Read range: The distance from which a reader can communicate with a tag. Active tags have a longer read range than passive tags because they use a battery to transmit signals to the reader. With passive tags, the read range is influenced by frequency, reader output power, antenna design, and method of powering up the tag. Low frequency tags use inductive coupling (see above), which requires the tag to be within a few feet of the reader.

Read rate: Often used to describe the number of tags that can be read within a given period. The read rate can also mean the maximum rate at which data can be read from a tag expressed in bits or bytes per second. (See Data transfer rate.)

Read-write tag: an RFID tag that can store new information on its microchip. These tags are often used on reusable containers and other assets. When the contents of the container are changed, new information is written to the tag. Read-write tags are more expensive than read-only tags.

RFID tag: A microchip attached to an antenna that is packaged in a way that it can be applied to an object. The tag picks up signals from and sends signals to a reader. The tag contains a unique serial number, but may have other information, such as a customers' account number. Tags come in many forms, such smart labels that can have a barcode printed on it, or the tag can simply be mounted inside a carton or embedded in plastic. RFID tags can be active, passive or semi-passive.

Scanner: An electronic device that can send and receive radio waves. When combined with a digital signal processor that turns the waves into bits of information, the scanner is called a reader or interrogator.

Savants: Middleware created by the Auto-ID Center to filter data from EPC readers and pass it on to enterprise systems. It was envisioned that Savants would reside on servers across the EPC Network and pass data to one another and act as a kind of nervous system for the network. The term is being phase out by EPCglobal and many of the functions of Savants are being incorporated in commercial middleware products.

Semi-passive tag: Similar to active tags, but the battery is used to run the microchip's circuitry but not to broadcast a signal to the reader. Some semi-passive tags sleep until they are woken up by a signal from the reader, which conserves battery life. Semi-passive tags can cost a dollar or more. These tags are sometimes called battery-assisted tags.

Sensor: A device that responds to a physical stimulus and produces an electronic signal. Sensors are increasingly being combined with RFID tags to detect the presence of a stimulus at an identifiable location.

Silent Commerce: This term covers all business solutions enabled by tagging, tracking, sensing and other technologies, including RFID, which make everyday objects intelligent and interactive. When combined with continuous and pervasive Internet connectivity, they form a new infrastructure that enables companies to collect data and deliver services without human interaction.

Signal attenuation: The weakening of RF energy from an RFID tag or reader. Water absorbs UHF energy, causing signal attenuation.

Singulation: A means by which an RFID reader identifies a tag with a specific serial number from a number of tags in its field. There are different methods of singulation, but the most common is "tree walking", which involves asking all tags with a serial number that starts with either a 1 or 0 to respond. If more than one responds, the reader might ask for all tags with a serial number that starts with 01 to respond, and then 010. It keeps doing this until it finds the tag it is looking for. (See Reader talks first.)

Smart label: A generic term that usually refers to a barcode label that contains an RFID transponder. It's considered "smart" because it can store information, such as a unique serial number, and communicate with a reader.

Smart cards: See Contactless smart cards.

SAW (Surface Acoustic Wave): A technology used for automatic identification in which low power microwave radio frequency signals are converted to ultrasonic acoustic signals by a piezoelectric crystalline material in the transponder. Variations in the reflected signal can be used to provide a unique identity.

Synchronization: Timing readers or reader antennas near one another so that they don't interfere with one another.

Tag: See RFID tag

Tag talks first: A means by which a reader in a passive UHF system identifies tags in the field. When tags enter the reader's field, they immediately communicate their presence by reflecting back a signal. This is useful when you want to know everything that is passing a reader, such as when items are moving quickly on a conveyor. In other cases, the reader wants to simply find specific tags in a field, in which case it wants to broadcast a signal and have only certain tags respond. (See Reader talks first.)

Time Division Multiple Access (TDMA): A method of solving the problem of the signals of two readers colliding. Algorithms are used to make sure the readers attempt to read tags at different times.

Transceiver: A device that both transmits and receives radio waves.

Transponder: A radio transmitter-receiver that is activated when it receives a predetermined signal. RFID transponders come in many forms, including smart labels, simple tags, smart cards and keychain fobs. RFID tags are sometimes referred to as transponders.

Ultra-high frequency (UHF): From 300 MHz to 3 GHz. Typically, RFID tags that operate between 866 MHz to 960 MHz. They can send information faster and farther than high- and low-frequency tags. But radio waves don't pass through items with high water content, such as fruit, at these frequencies. UHF tags are also more expensive than low-frequency tags, and they use more power.

Uniform Code Council (UCC): The nonprofit organization that oversees the Uniform Product Code, the barcode standard used in North America.

Unique Identifier (UID): A serial number that identifies the transponder. The U.S. Department of Defense has also developed an identification scheme called UID.

Universal Product Code (UPC): The barcode standard used in North America. It is administered by the Uniform Code Council.

WORM: Write once, read many. A tag that can be written to only once by the user. Thereafter, the tag can only be read.

Write rate: The rate at which information is transferred to a tag, written into the tag's memory and verified as being correct.

XML: See eXtensible Markup Language.

XML Query Language (XQL): A method of searching a database based on the extensible markup language (XML). Files created using the Auto-ID Center's Physical Markup Language can be searched using XQL.

What is claimed is:

1. A method of mapping subsurface fracture geometry, comprising:
    distributing a plurality of sensors through a hole created in an earth subsurface formation located outside the annulus of a wellbore;
    transmitting an electrical current through a first power source through the earth subsurface, the electrical current creating an electrical field in the earth subsurface to deliver electrical current to power the plurality of sensors, the plurality of sensors transmitting a signal data to a downhole toolset;
    locating the downhole toolset in communication with a cable through the wellbore in the earth subsurface, the downhole toolset being lowered through the wellbore, the downhole toolset being powered by a second power source via the cable; and
    receiving and transcribing the signal data by the downhole toolset followed by transmission of the signal data to a unit outside the wellbore
    wherein the downhole toolset includes an anode cylinder and a cathode cylinder used to inject electrical current into the earth subsurface for broadcasting specific communication protocols to the plurality of sensors.

2. The method of claim 1, wherein the plurality of sensors are RFID sensors.

3. The method of claim 1, wherein the unit is a logging unit.

4. The method of claim 1, wherein the unit is a virtual logging unit configured to receive the signal data via satellite communication.

5. The method of claim 1, wherein the plurality of sensors are passed through the hole with proppant.

6. The method of claim 1, wherein the sensors are sized to pass within fractures in the earth subsurface.

7. The method of claim 6, wherein tensile fractures are undetectable by microseismic methods.

8. The method of claim 1, wherein the electrical current is supplied over a plurality of time intervals.

9. The method of claim 1, wherein the electrical current is supplied to the cable outside of the hole above the earth subsurface.

10. The method of claim 1, wherein the downhole toolset includes a reader configured to both provide power to the plurality of sensors and to receive the signal data from the plurality of sensors.

11. The method of claim 10, wherein the reader can transmit communications to the plurality of sensors, the frequencies of the communications and the signal data being different.

12. The method of claim 1, wherein the electrical current is provided through a surface power supply outside the hole.

13. The method of claim 1, wherein the plurality of sensors and the downhole tool receive power from separate sources so as to avoid self-jamming.

14. The method of claim 1, wherein the plurality of sensors are coated with a material to resist abrasion from sand particles.

15. The method of claim 1, wherein the plurality of sensors have at least two specific densities.

16. The method of claim 1, wherein the size of the plurality of sensors is 2.5 mm in diameter or smaller.

17. The method of claim 1, wherein the size of the plurality of sensors may be adjusted by changing the thickness of a coating applied to the plurality of sensors.

18. The method of claim 1, further comprising:
recording and archiving the signal data by the unit.

19. A method of mapping subsurface fracture geometry, comprising:
distributing a plurality of sensors through a hole created in an earth subsurface formation located outside the annulus of a wellbore;
transmitting an electrical current through a first power source through the earth subsurface, the electrical current creating an electrical field in the earth subsurface to deliver electrical current to power the plurality of sensors, the plurality of sensors transmitting a signal data to a downhole toolset;
locating the downhole toolset in communication with a cable through the wellbore in the earth subsurface, the downhole toolset being lowered through the wellbore, the downhole toolset being powered by a second power source via the cable; and
receiving and transcribing the signal data by the downhole toolset followed by transmission of the signal data to a unit outside the wellbore;
wherein the plurality of sensors have at least two specific densities.

* * * * *